Feb. 2, 1971     T. C. AGGARWAL     3,559,512
SERIES VIBRATION DAMPER
Filed June 27, 1969

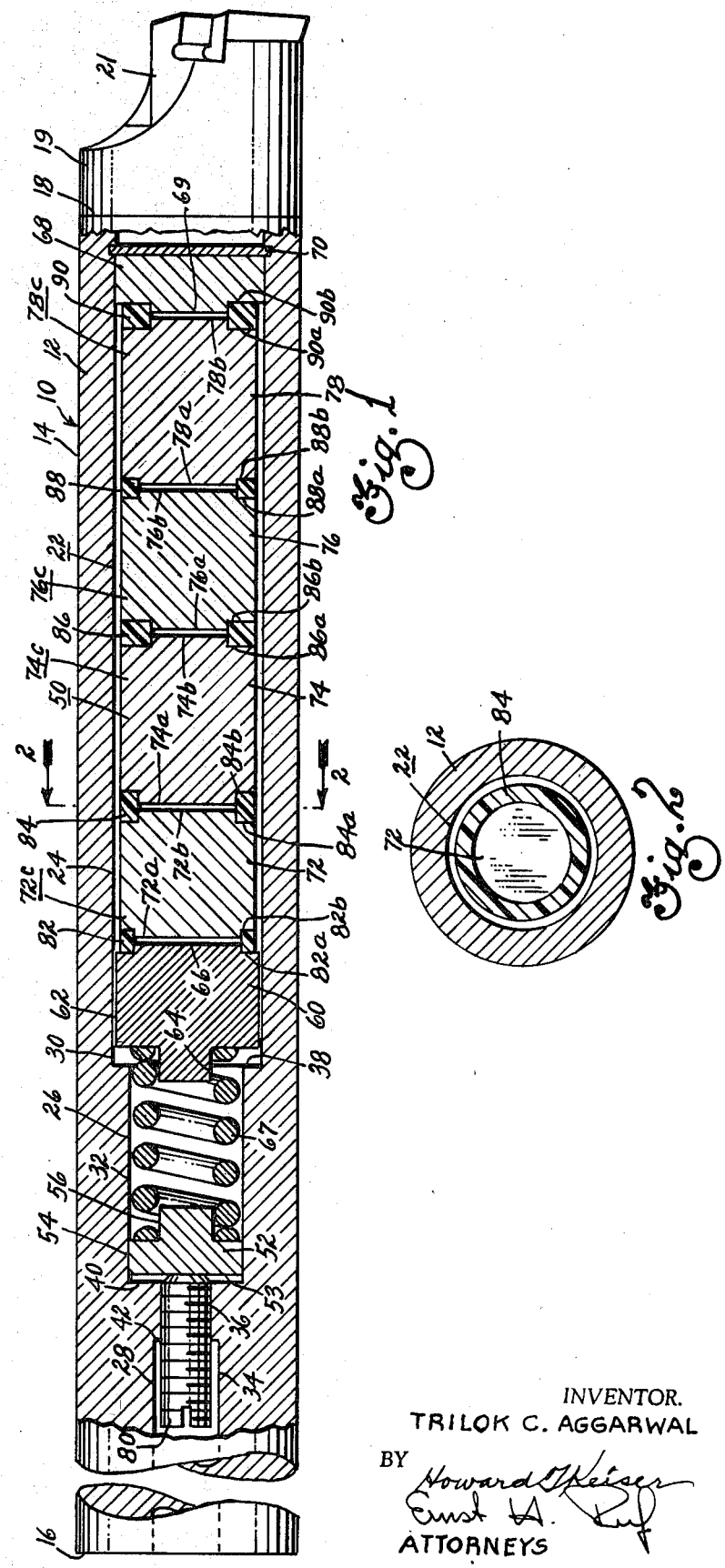

3,559,512
SERIES VIBRATION DAMPER
Trilok C. Aggarwal, Cincinnati, Ohio, assignor to The Cincinnati Milling Machine Co., Cincinnati, Ohio, a corporation of Ohio
Filed June 27, 1969, Ser. No. 837,191
Int. Cl. B23b 29/03
U.S. Cl. 77—58          11 Claims

ABSTRACT OF THE DISCLOSURE

A series vibration damper unit for a variable natural frequency machine tool member wherein a series or several tandem sets of individual dampers, each comprising a damping mass effectively supported by two viscoelastic absorber elements, are arranged so that there is effective damping of said member over the usable frequency range of said variable natural frequency member.

BACKGROUND OF THE INVENTION

Field of the invention

This invention relates generally to tuned damped series vibration absorbers particularly for use on variable natural frequency machine tool members. Although this invention is described with reference to variable length boring bars and variable length spindle bars, it is also applicable to other tools variously utilized in milling, boring and grinding machines, as well as on any other machines where a cutting tool and the work are rotated relative to each other.

Description of the prior art

Most of the prior applications of vibration dampers on machine tool components are those wherein the component to be damped has but one particular natural frequency, for example, the vibration damper for the fixed length boring bar disclosed in U.S. Pat. 3,447,402. However, if the natural frequency of the machine component changes during the machining operation e.g. the length of a boring bar is changed, then such a fixed frequency or single damper design is of very little value.

While multiple damper installations have been utilized in machine tool components they generally have pluralities of alternately arranged damping masses and damping materials, e.g. in U.S. Pat. 2,960,189 each damping mass is connected to the vibrating machine tool member independently through the damping materials. Such a design, which is essentially a plurality of damper units connected in parallel to the vibrating member or component, although usable and workable, when compared to this invention is relatively less efficient in damping out the vibrations of the machine members for a broad range of natural frequencies.

SUMMARY OF THE INVENTION

In accordance with this invention an improvement in the range of 2:1 is readily obtained over the previously described parallel multiple damper vibration absorber. The series vibration damper of this invention can be used much more effectively for a broader range of natural frequencies in damping a variable natural frequency machine tool member.

In summary, this invention provides a series damper for damping a broad range of vibrations of a variable natural frequency machine tool member, having a longitudinal bore, with the damper being composed of a plurality of damping masses and viscoelastic absorber elements contained within the bore, with each of the masses and absorber elements having axially spaced end faces and being independently radially movable relative to each other and to the longitudinal axis of the member, with these masses and absorber elements being arranged in alternate relationship so that each of said masses has its end faces in engagement with an end face of a pair of the absorber elements; yieldable means carried by the member and operatively connected to urge the adjacent faces of the masses and absorber elements into engagement and; closure means operatively connected to the member for closing the bore to retain the masses, absorber elements and yieldable means therein, whereby the viscoelastic absorber elements provide both the required damping capacity and stiffness and the vibratory energy of the member is dissipated by the shear resistance afforded by the relative radial movement between the damping masses and viscoelastic absorber elements. In addition, an adjusting means may be carried by the member to adjust the yieldable means to effect an adjustment of the degree of engagement between the adjacent faces of the masses and absorber elements.

BRIEF DESCRIPTION OF THE DRAWINGS

FIG. 1 is a longitudinal sectional view of a variable length machine tool boring bar body assembly incorporating the adjustable internal series vibration damper of this invention.

FIG. 2 is a sectional view taken along line 2—2 of FIG. 1.

DESCRIPTION OF THE PREFERRED EMBODIMENT

Figure 3:
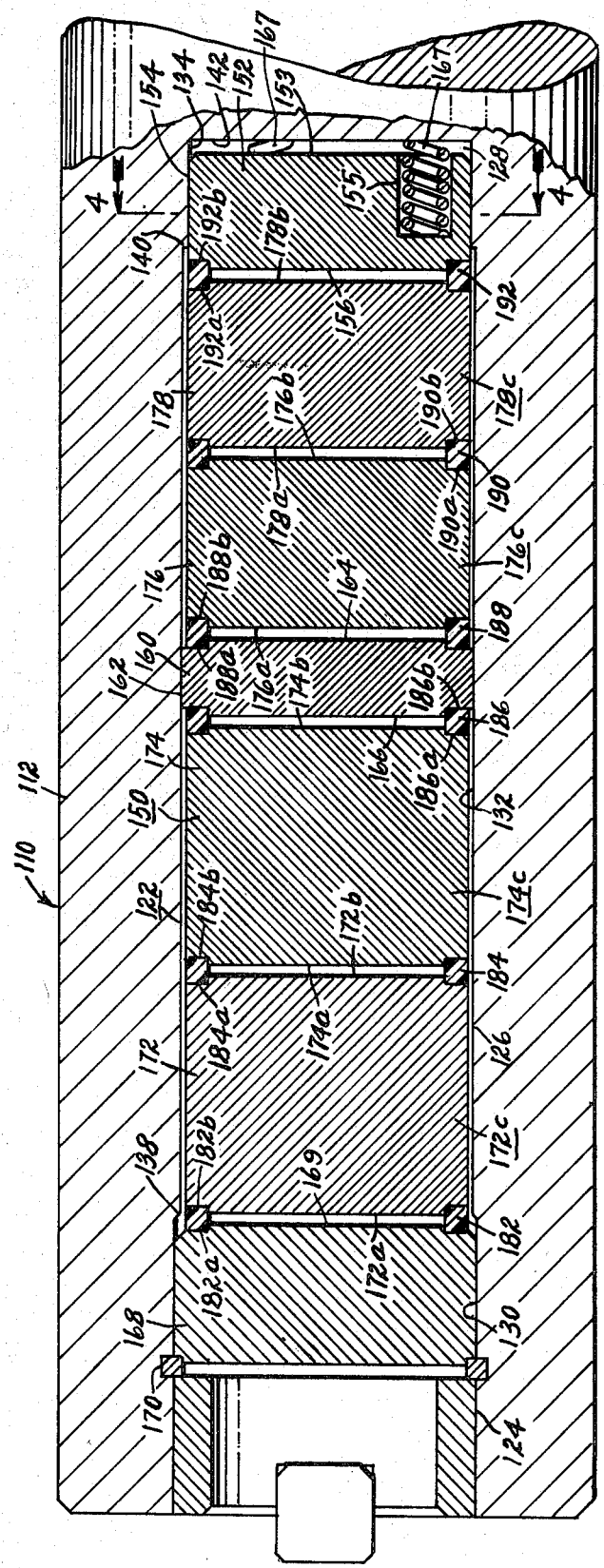
FIG. 3 is a longitudinal sectional view of a variable length machine tool spindle bar incorporating the internal series vibration damper of this invention.

Referring now to the drawings in detail, FIG. 1 is a longitudinal sectional view of a variable length machine tool boring bar body assembly 10 composed of boring bar body 12 incorporating adjustable internal series damper unit 50. Circular boring bar body 12, having outer surface 14, perpendicular rear end surface 16 and perpendicular front end surface 18, as well as boring head 19 and cutting tool 21 also has central bore 22 comprised of stepped smooth bore portions 24, 26, 28 having peripheral wall surfaces 30, 32, 34 respectively and internally threaded bore portion 36. Defining the inner ends of bore portions 24, 26, 28 are ring surfaces 38, 40, 42, respectively, all perpendicular to central bore 22, with threaded bore portion 36 being located between surfaces 40 and 42.

Located within central bore 22 is adjustable internal series vibration damper 50 composed in part of slidable rear abutment means 52, having rear end surface 53 and smooth cylindrical portions 54 and 56; intermediate abutment means 60, having smooth cylindrical portions 62, 64, as well as stepped end face 66, with portion 62 in sliding engagement with peripheral wall surface 30 of bore portion 24; resilient or yieldable means 67 yieldingly retained and centered by smooth cylindrical portions 56 and 64; and generally circular disc front abutment or closure means 68, having stepped end face 69, fixedly retained in bore portion 24 by expending ring 70 in peripheral wall surface 30.

Yieldingly retained and centered between end faces 66 and 69 in alternate and abutting relationship are multiple independent, generally cylindrical, damping masses 72, 74, 76, 78 and multiple independent, generally ring-shaped, (see FIG. 2) viscoelastic absorber elements 82, 84, 86, 88, 90, having axially spaced end faces 82a, 82b; 84a, 84b; 86a, 86b; 88a, 88b; 90a, 90b; respectively. Damping masses 72, 74, 76, 78 have axially spaced stepped end faces 72a, 72b; 74a, 74b; 76a, 76b; 78a, 78b respectively and together with end faces 66, 69 serve to locate the viscoelastic absorber elements on their inside diameters and end faces so that end faces 82a, 82b abut end faces 66, 72a, respectively; end faces 84a, 84b abut end faces 72b, 74a, respectively; end faces 86a, 86b abut end faces 74b, 76a, respectively; end faces 88a, 88b abut end faces 76b, 78a, espectivery; anld end faces 90a, 90b abut end faces 78b, 69 respectively. Thus, viscoelastic absorber elements 82, 84 effectively support damping mass 72; elements 84, 86 support mass 74; elements 86, 88 support mass 76 and elements 88, 90 support mass 78, thereby defining four in-series dampers 72c, 74c, 76c, 78c, respectively. As may be seen in FIG. 1, each of the damping masses is fully independently supported by two of the viscoelastic absorber elements so that none of the damping masses touch each other, with said damping masses and absorber elements having diameter less than that of bore 24 so that the vibratory energy of boring bar body assembly 10 is dissipated by the shear resistance of the viscoelastic absorber elements opposing the radial movement between said damping masses and said viscoelastic absorber elements. A threaded adjusting means 80 is inserted in threaded bore portion 36 and has one end abutting rear end surface 53 of rear abutment means 52 while its slotted other end extends into bore portion 28. A locking means (not shown), such as a nylon insert, should be provided between threaded bore portion 36 and adjusting means 80.

Thus, as shown in FIG. 1, boring bar body assembly 10 essentially consists of a cylindrical piece of steel 12 with tunable damped series absorber 50 mounted internally in the forward section (position of maximum amplitude) thereof, while the rear section is used to house adjusting or tuning means 80. Damping masses 72, 74, 76, 78, which preferably have like outside diameters, may be of like or different lengths, densities, weights or material compositions. Viscoelastic absorber elements 82, 84, 86, 88, 90, which again preferably have the same outside diameters as the damping masses, may also be of like or differing lengths, densities, weights, material compositions or have differing inside diameters. Damping masses 72, 74, 76, 78 are supported by and between ring-shaped viscoelastic absorber elements 82, 84, 86, 88, 90 respectively; with said viscoelastic absorber elements supplying both the spring and damping mechanism for damper unit 50. It is very important that these damping masses always remain freely supported by these viscoelastic absorber elements. Front and intermediate abutment means 68, 60 must be of such a fit that all or nearly all of the motion that takes place within bore 22 is due to the damping masses shearing the viscoelastic material. Bore 24, having peripheral wall surface 30 should be reamed and abutment means 60 and 68 should be ground on their cylindrical outer surfaces. In addition, independent masses 72, 74, 76, 78 may be either of graduated weights progressively positioned with the heaviest one adjacent to one end of bore 24 and the lightest one adjacent to the opposite end of said bore, or of unequal weights randomly positioned within bore 24, the placement thereof being dependent upon the frequency range and amplitude of the vibrations to be damped.

FIG. 3 is a longitudinal sectional view of a variable length machine tool spindle bar 110 composed of generally cylindrical spindle bar body 112 incorporating series vibration damper 150. Spindle bar body 112 has a central bore 122 comprised of stepped smooth bore portions 124, 126, 128 having peripheral wall surfaces 130, 132, 134 respectively. Defining the inner ends of bore portions 124, 126, 128 are generally ring-shaped surfaces 138, 140 and circular surface 142 respectively, with surface 142 being perpendicular to central bore 122.

Figure 4:
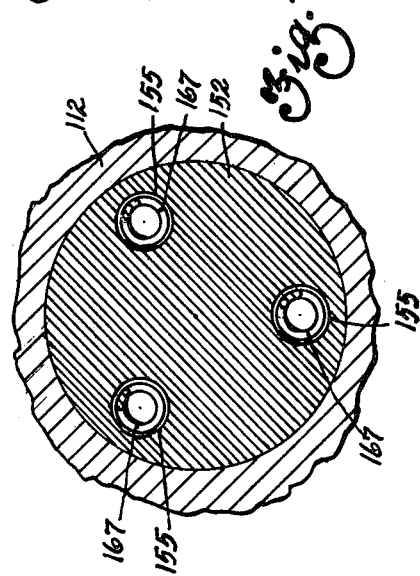
FIG. 4 is a sectional view taken along lines 4—4 of FIG. 3.

Located within central bore 122 is internal series vibration damper 150 composed in part of slidable rear abutment means 152 having rear end surface 153 with multiple equally spaced blind recesses 155 and smooth cylindrical portion 154, as well as stepped end face 156, with portion 154 being in slidable engagement with peripheral wall surface 134; multiples of resilient or yieldable means 167 yieldingly retained in blind recesses 155 (as best seen in FIG. 4) and having one end of each abutting circular surface 142; intermediate abutment means 160 having smooth cylindrical portion 162, as well as stepped axially spaced end faces 164, 166, with portion 162 in sliding engagement with peripheral wall surface 132; and front abutment or closure means 168, having stepped end face 169, fixedly retained in bore portion 124 by expanding ring 170 in peripheral wall surface 130. Yieldingly retained and centered between end faces 169, 166, and 164, 156, i.e., between the front and intermediate as well as the intermediate and rear abutment means, are two sets of multiple in-series, generally cylindrical damping masses 172, 174, and 176, 178 respectively as well as two sets of multiple in-series, generally ring-shaped viscoelastic absorber elements 182, 184, 186 and 188, 190, 192 having axially spaced end faces 182a, 182b; 184a, 184b; 186a, 186b; 188a, 188b; 190a, 190b, 192a, 192b; respectively, said damper masses and absorber elements being in alternate abutting relationship and generally similar to those shown in FIG. 1.

Damping masses 172, 174, 176, 178 have axially spaced stepped end faces 172a, 172b; 174a, 174b; 176a, 176b; 178a, 178b respectively and together with end faces 156, 164, 166, 169 serve to locate the viscoelastic absorber elements on their inside diameters and end faces so that end faces 182a, 182b abut end faces 169, 172a, respectively; end faces 184a, 184b abut end faces 172b, 174a, respectively; end faces 186a, 186b abut end faces 174b, 166 respectively; end faces 188a, 188b abut end faces 164, 176a, respectively; end faces 190a, 190b abut end faces 176b, 178a, respectively; and end faces 192a, 192b abut end faces 178b, 156 respectively. Thus, viscoelastic absorber elements 182, 184 effectively support damping mass 172; elements 184, 186 support mass 174; elements 188, 190 support mass 176; and elements 190, 192 support mass 178, thereby defining two sets of multiple in-series dampers 172c, 174c and 176c, 178c, respectively. Again, as in FIG. 1, each of the damping masses is fully independently supported by two of the viscoelastic absorber elements so that none of the damping masses touch each other, with said damping masses and absorber elements having diameters less than that of bore 126 so that the vibratory energy of the machine tool spindle bar is dissipated by the shear resistance of the viscoelastic absorber elements opposing the radial movement between said independent masses and said independent viscoelastic absorber elements.

Series tuned vibration absorbers 50 or 150 are designed for a system having variable stiffness, i.e. variable natural frequency, for use, by way of example, on machine tool members, whose natural frequencies vary with tool positioning as in bar mill spindles and variable length boring bars, as distinguished from a single vibration absorber used to dampen out the maximum vibration compliance of a machine tool member at one particular natural frequency, such as for example, the damper for the fixed length boring bar disclosed in U.S. Pat. 3,447,402 also assigned to the assignee of this invention. Damper 50 for example utilizes four dampers 72c, 74c, 76c, 78c, consisting of damping masses 72, 74, 76, 78 and viscoelastic absorber elements 82, 84, 86, 88, 90 connected in series within bore 22 of boring bar body 12.

Damper 150 for example utilizes four dampers 172c, 174c, 176c, 178c, arranged in two sets of two dampers each in-series, separated by slidable intermediate abutment means 160. By utilizing several tandem sets of dampers and one or more intermediate abutment means, larger damping masses can be utilized.

In operation, all dampers vibrate at all times, but the amplitude of the vibration of each damper depends on the frequency of excitation, with the heavier dampers vibrating at lower frequencies and the lighter dampers at higher frequencies, but at all frequencies within the frequency range there will be some combination of vibrating dampers.

If the variable length boring bar body or member 12 of FIG. 1, for example, has a usable length ranging from a 10 inch minimum, at a natural frequency of 300 Hertz, to 18 inches maximum, at a natural frequency of 70 Hertz, then design of a series tuned vibration absorber 50 may be performed as follows:

(1) Selection of a finite number of intermediate positions in addition to and between the minimum and maximum length positions (i.e. for example, 12, 14, 16, 18 inches).

(2) Determination of the natural frequency of the member at positions 12, 14, 16, 18 (either mathematically or by actual construction).

(3) Design four dampers (such as 72c, 74, 76c, 78c, each comprising a damping mass and two viscoelastic absorber elements, such as damping mass 72 supported between absorber elements 82, 84; said absorber elements providing both the spring constant and the damping mechanism) with respect to the frequencies calculated at (2) above.

(4) Installation and tuning of the dampers within the member.

While the above example makes use of four series dampers it is also possible to use more individual dampers in series which will result in even more improvement in the dynamic stiffness.

The function of yieldable or resilient means 67 and 167, whether adjustable or nonadjustable, is to provide the necessary preloading of the viscoelastic absorber elements and to assure their proper location together with the damping masses within their respective bores. Spindle bar 110, by reason of its nonadjustability of yieldable means 167 is essentially a fixed frequency range design because of the constant preloading of viscoelastic absorber elements 182, 184, 186, 188, 190, 192. However, its frequency range may be shifted by changing yieldable means 167. In boring bar body assembly 10, by reason of its adjustability of yieldable means 67 by turning threaded adjustment means 80, the degree of engagement from nominal preload to maximum preload of viscoelastic absorber elements 82, 84, 86, 88, 90, permits an up to 35% stiffness variation of said absorber elements, thus allowing a shifting of their frequency range to permit vibration control adjustment.

Instrumentation is needed for the final tuning of series damper unit 50 and this is accomplished by exciting boring bar body assembly 10 and varying the preload on the viscoelastic absorber elements (as previously described), until the point of minimum response or corresponding maximum dynamic stiffness is determined at one of the points within its usable length. Insertion of a suitable resilient means 167, i.e. one that will give the proper preload, in-series damper unit 150 in spindle bar 110, when it is assembled, precludes further tuning at runoff and allows use immediately upon assembly.

While this invention has been described in connection with possible forms or embodiments thereof, it is to be understood that the present disclosure is illustrative rather than restrictive and that changes or modifications may be resorted to without departing from the spirit of the invention.

What I claim is:

1. A series vibration damper for damping a broad range of vibrations of a variable natural frequency machine tool member having a longitudinal bore comprising:
    (a) a front abutment means fixedly retained as to said bore;
    (b) intermediate and rear abutment means slidably retained as to said bore;
    (c) yieldable means operatively connected between said intermediate and rear abutment means;
    (d) a plurality of damping masses and viscoelastic absorber elements receivable in alternate relationship between said front and intermediate abutment means, said masses and absorber elements having diameters less than that of said bore to permit independent radial movement thereof within said bore, with each of said masses and absorber elements having axially spaced end faces, said yieldable means preloading said viscoelastic absorber elements and maintaining the adjacent faces of said masses and absorber elements in abutting engagement; and
    (e) adjusting means carried by the member and operatively connected to adjust said yieldable means to vary the preload of said viscoelastic absorber elements and cause a stiffness variation in said elements thus allowing a shifting of their frequency range to permit vibration control adjustment, with said viscoelastic absorber elements providing both optimum damping capacity and proper stiffness and the vibratory energy of said member being dissipated by the shear resistance afforded by the relative radial movement between said damping masses and viscoelastic absorber elements.

2. A series vibration damper for damping a broad range of vibrations of a variable natural frequency machine tool member having a longitudinal bore comprising:
    (a) a front abutment means fixedly retained as to said bore;
    (b) intermediate and rear abutment means slidably retained as to said bore;
    (c) yieldable means operatively connected between the inner end of said bore and said rear abutment means;
    (d) a plurality of damping masses and viscoelastic absorber elements receivable in alternate relationship between said front and intermediate and said intermediate and rear abutment means, said masses and absorber elements having diameters less than that of said bore to permit independent radial movement thereof within said bore, with each of said masses and absorber elements having axially spaced end faces, said yieldable means maintaining the adjacent faces of said masses and absorber elements in abutting engagement, whereby said viscoelastic absorber elements provide both the required damping capacity and stiffness and the vibratory energy of said member is dissipated by the shear resistance afforded by the relative radial movement between said damping masses and viscoelastic absorber elements.

3. A series vibration damper for damping a broad range of vibrations of a variable natural frequency machine tool member having a longitudinal bore comprising:
    (a) a plurality of damping masses contained within said bore;
    (b) a plurality of viscoelastic absorber elements contained within said bore, with each of said masses and absorber elements having axially spaced end faces and being independently radially movable relative to each other and to the longitudinal axis of the member, said masses and absorber elements being arranged in alternate relationship so that each of said masses has its end faces in engagement with an end face of a pair of said absorber elements;
    (c) yieldable means carried by the member and operatively connected to urge the adjacent faces of said masses and absorber elements into engagement; and
    (d) closure means operatively connected to said member for closing said bore to retain said masses, absorber elements and yieldable means therein, with said yieldable means applying a preload on said viscoelastic absorber elements and said viscoelastic absorber elements providing both the required damping capacity as well as stiffness, and the vibratory energy of said member being dissipated by the shear resistance afforded by the relative radial movement between said damping masses and viscoelastic absorber elements.

4. The series vibration damper of claim 3 including adjusting means carried by the member and operatively connected to adjust said resilient means to effect an adjustment of the degree of engagement between the adjacent faces of said masses and said absorber elements, whereby adjustment of said degree of engagement varies the preload of said viscoelastic absorber element and causes a stiffness variation in said elements, thus allowing a shifting of their frequency range to permit vibration control adjustment.

5. The series vibration damper of claim 3 wherein said damping masses are of graduated weights progressively positioned with the heaviest one adjacent to one end of the bore in the member and the lightest one adjacent the opposite end of the bore in the member whereby the initial vibratory frequency of the member will effect the independent radial movement of the heaviest mass and increased vibratory frequency of the member will successively effect independent radial movement of the lighter masses to effectively dampen the vibration of the member throughout varying ranges of its vibratory frequency.

6. The series vibration damper of claim 3 wherein said damping masses are of unequal weights and randomly positioned within said bore.

7. The series vibration damper of claim 3 wherein at least one of said damping masses has a density differing from the remainder of said masses.

8. The series vibration damper of claim 3 wherein at least one of said viscoelastic absorber elements has a material composition differing from the remainder of said viscoelastic absorber elements.

9. The series vibration damper of claim 3 wherein said damping masses and viscoelastic absorber elements are of circular and cylindrical cross section, respectively.

10. The series vibration damper of claim 9 wherein the outside diameters of said cross sections are substantially similar.

11. A multiple set of series vibration dampers for damping a broad range of vibrations of a variable natural frequency machine tool member having a longitudinal bore comprising:

(a) a front abutment means fixedly retained as to said bore;

(b) at least one intermediate abutment means slidably retained as to said bore;

(c) a rear abutment means slidably retained as to said bore;

(d) a plurality of damping masses and viscoelastic absorber elements receivable in alternate abutting relationship between said front and intermediate and said intermediate and rear abutment means, said masses and absorber elements having diameters less than that of said bore to permit independent radial movement thereof within said bore, with each of said masses and absorber elements having axially spaced end faces; and (e) yieldable means carried within the bore and operatively connected to urge the adjacent faces of said masses and absorber elements into engagement, with said yieldable means applying a preload on said viscoelastic absorber elements and said viscoelastic absorber elements providing both the required damping capacity as well as stiffness, and the vibratory energy of said member being dissipated by the shear resistance afforded by the relative radial movement between said damping masses and viscoelastic absorber elements.

References Cited

UNITED STATES PATENTS

| | | | |
|---|---|---|---|
| 2,051,954 | 8/1936 | Leland | 77—58 |
| 2,960,189 | 11/1960 | Osburn | 77—58 |
| 3,447,402 | 6/1969 | Ray | 77—58 |

GERALD A. DOST, Primary Examiner